(12) United States Patent
Tang et al.

(10) Patent No.: US 12,017,926 B2
(45) Date of Patent: Jun. 25, 2024

(54) NI-RICH TERNARY CATHODE MATERIAL, PREPARATION METHOD AND APPLICATION THEREOF

(71) Applicant: CENTRAL SOUTH UNIVERSITY, Changsha (CN)

(72) Inventors: Yougen Tang, Changsha (CN); Ze Feng, Changsha (CN); Haiyan Wang, Changsha (CN); Dan Sun, Changsha (CN); Shan Zhang, Changsha (CN)

(73) Assignee: CENTRAL SOUTH UNIVERSITY, Changsha (CN)

( * ) Notice: Subject to any disclaimer, the term of this patent is extended or adjusted under 35 U.S.C. 154(b) by 130 days.

(21) Appl. No.: 17/405,317

(22) Filed: Aug. 18, 2021

(65) Prior Publication Data

US 2022/0055915 A1 Feb. 24, 2022

(30) Foreign Application Priority Data

Aug. 19, 2020 (CN) .......................... 202010835567.6

(51) Int. Cl.
  *C01G 53/04* (2006.01)
  *H01M 10/0525* (2010.01)
(52) U.S. Cl.
  CPC ........ *C01G 53/04* (2013.01); *H01M 10/0525* (2013.01); *C01P 2002/01* (2013.01); *C01P 2002/74* (2013.01); *C01P 2004/03* (2013.01); *C01P 2004/04* (2013.01)
(58) Field of Classification Search
  CPC ........ H01M 2004/028; H01M 10/0525; C01G 53/04; C01G 53/006
  See application file for complete search history.

(56) References Cited

FOREIGN PATENT DOCUMENTS

| CN | 107799731 A | * | 3/2018 | ........ H01M 10/0525 |
| CN | 108298599 A | * | 7/2018 | ........... C01G 53/006 |
| CN | 110931738 A | * | 3/2020 | ........ H01M 10/0525 |

OTHER PUBLICATIONS

CN107799731A—Machine Translation (2018) (Year: 2018).*
CN110931738A—Machine Translation (2020) (Year: 2020).*
CN108298599A—Machine Translation (2018) (Year: 2018).*

* cited by examiner

*Primary Examiner* — Haroon S. Sheikh
*Assistant Examiner* — Aryana Y. Ortiz
(74) *Attorney, Agent, or Firm* — Tutunjian & Bitetto, P.C.

(57) ABSTRACT

A Ni-rich ternary cathode material, a preparation method and application thereof are disclosed. The method for preparing a Ni-rich ternary cathode material includes: using a Ni—Co—Mn ternary cathode material as a precursor and a metal boride as a modifier, adding a lithium-derived material, heating for a sintering, to prepare the Ni-rich ternary cathode material.

13 Claims, 14 Drawing Sheets

NI-RICH TERNARY CATHODE MATERIAL, PREPARATION METHOD AND APPLICATION THEREOF

CROSS REFERENCE TO RELATED APPLICATION

This application claims the benefit and priority of Chinese Patent Application No. 202010835567.6 filed on Aug. 19, 2020, the disclosure of which is incorporated by reference herein in its entirety as part of the present application.

TECHNICAL FIELD

The present disclosure relates to the technical field of high-energy battery materials, and specifically relates to a Ni-rich ternary cathode material with high stability, a preparation method and application thereof.

BACKGROUND ART

As the technology of the lithium-ion battery with high specific energy is continuously developed, electric vehicles powered by the lithium-ion battery has gradually increased running mileage, and its market share is getting higher and higher. However, as the lithium-ion battery with high specific energy continues to be popularized to the market, its defects are constantly appeared, such as rapid battery attenuation and poor rate capability, especially the combustion of the electric vehicles and the injury incidents caused by the battery ignition and explosion, which greatly arouse social concern and worries about the safety of the electric vehicles. In the first half of 2020 alone, there have been more than 20 fire accidents of the electric vehicles happened in China, involving in 28 electric vehicles, most of which are powered by the lithium-ion batteries with high specific energy assembled with Ni-rich cathode materials. The number of fire accidents of electric vehicles is low from January to March, gradually increases from April to June, and reaches to the peak from July to September with the reason that the period from July to September is the hot season, and the internal temperature of the electric vehicles increases sharply under the exposure of the sun in summer.

At present, the used lithium-ion battery with high specific energy needs to use the cathode material with high Ni content. However, as the Ni content increases, the thermal stability of the cathode material decreases sharply. Compared with the low-Ni or non-Ni materials, the Ni-rich cathode materials NCA and NCM811 have high heat-releasing ability due to their poor oxygen atom stability. Therefore, the lithium-ion battery with high specific energy assembled with the Ni-rich ternary cathode material has poor thermal stability. To improve the structure and thermal stability of the Ni-rich ternary cathode material for its industrial application, it is often necessary to modify the Ni-rich ternary cathode material to obtain an ideal Ni-rich ternary cathode material. The structure and interface of the Ni-rich ternary cathode material could be greatly modified by element doping and surface coating. However, multi-step synthesis with relatively complicated preparation process is often required to obtain the material with modified structure and interface.

SUMMARY

To overcome the above shortcomings of the prior art, the present disclosure is to provide a Ni-rich ternary cathode material with high stability, a preparation method and application thereof. In the present disclosure, a Ni-rich ternary cathode material with high stability, diatomic lattice doping and interface coating could be synthesized in one step by using a metal boride as a modifier and regulating the heating process and sintering time. The ternary cathode material obtained after being modified by the method of the present disclosure has excellent ambient-temperature and high-temperature electrochemical performances, and excellent high voltage resistance.

The objects of the present disclosure are achieved by the following technical solutions:

A method for preparing a Ni-rich ternary cathode material, comprising:
using a Ni—Co—Mn ternary cathode material as a precursor, and a metal boride as a modifier, adding a lithium-derived material, and heating for a sintering, to prepare the Ni-rich ternary cathode material.

In some embodiments, the metal boride comprises a transition metal boride, and is preferably one or two selected from the group consisting of $ZrB_2$ and $TiB_2$.

In some embodiments, the heating for a sintering comprises a low-temperature sintering and a high-temperature sintering, wherein a heating rate during the low-temperature sintering is not more than 2° C./min, preferably 1.5-1.8° C./min, and most preferably 1.5° C./min, and a heating rate during the high-temperature sintering is not more than 0.75° C./min, preferably 0.5-0.75° C./min, and most preferably 0.75° C./min.

It can be seen from the test of the present disclosure that under the condition that a heating rate during the low-temperature sintering is not more than 2° C./min, and that during the high-temperature sintering is not more than 0.75° C./min, a good surface coating layer made of lithium zirconium/titanium oxides could be obtained. Under the condition that the heating rate is too slow, the time cost is increased. The cost performance is relatively good within the preferable heating rate range. While the heating rate is too fast, exceeding the heating rate range of the sintering of the present disclosure, the surface coating would be failed.

In some embodiments, the low-temperature sintering is conducted to 550-700° C., preferably 600-650° C., and most preferably 650° C.; the high-temperature sintering is conducted to 750-850° C., preferably 800-850° C., and most preferably 800° C.

In some embodiments, the low-temperature sintering is conducted for 1-5 h, and preferably 3-4 h; the high-temperature sintering is conducted for 5-15 h, and preferably 8-12 h.

In some embodiments, the Ni—Co—Mn ternary cathode material as a precursor comprises $Ni_xCo_yMn_{1-x-y}(OH)_2$, where $0.8 \leq x < 1$, $0 < y < 0.2$, $x+y<1$, and is preferably selected from the group consisting of $Ni_{0.8}Co_{0.1}Mn_{0.1}(OH)_2$, $Ni_{0.83}Co_{0.085}Mn_{0.085}(OH)_2$, and $Ni_{0.9}Co_{0.05}Mn_{0.05}(OH)_2$. The lithium-derived material comprises one or two of $LiOH \cdot H_2O$ and $Li_2CO_3$.

In some embodiments, the method further comprises subjecting the Ni—Co—Mn ternary cathode material, the lithium-derived material and the metal boride to a mechanical ball milling in a certain ratio for a certain time, to obtain a uniformly mixed material.

In some embodiments, a molar ratio of the Ni—Co—Mn ternary cathode material to the lithium-derived material to the metal boride is ranging from 1:1.05:0.001 to 1:1.05:0.01, preferably 1:1.05:0.001 to 1:1.05:0.005, more preferably 1:1.05:0.001 to 1:1.05:0.003, and most preferably 1:1.05:0.002.

In some embodiments, the mechanical ball milling is conducted at a rotation speed of 200-500 rpm for 2-5 h.

The present disclosure also provides the Ni-rich ternary cathode material prepared by the above method. The Ni-rich ternary cathode material obtained after being modified by the method of the present disclosure has excellent ambient-temperature and high-temperature electrochemical performances, and excellent high voltage resistance.

The present disclosure discloses for the first time that only using one or two of the transition metal borides $ZrB_2$ and $TiB_2$ could obtain the diatomic lattice doping and the surface coating layer of lithium zirconium/titanium oxides. However, using zirconium/titanium oxides and boron oxide could not obtain the surface coating layer of lithium zirconium/titanium oxides. In addition, the heating rate during the sintering of the present disclosure is also very important for obtaining the diatomic lattice doping and the surface coating layer of lithium zirconium/titanium oxides. A good doping and surface coating effect only could be obtained under the conditions that the heating rate is within the range of the present disclosure.

Compared with the prior art, the present disclosure has the following advantages and beneficial effects:

According to the method of the present disclosure, a Ni-rich ternary cathode material with high stability, diatomic lattice doping and surface coating could be prepared in one-step by simply doping and at high temperature, optimizing boride as the modifier, and regulating the temperature. The Ni-rich ternary cathode material of the present disclosure has a simple preparation method and a low price. The diatomic lattice doping could effectively stabilize the transition metal layer and oxygen layer of the material, reduce the release of lattice oxygen in the material, and improve the structure stability of the material. In addition, the formation of the surface coating layer is beneficial to reduce the corrosion of the electrolyte to the material, and inhibit the dissolution of the transition metal, thereby greatly improving the interface stability of the material.

DETAILED DESCRIPTION OF THE EMBODIMENTS

The following examples are used to further illustrate the present disclosure, but not to limit the protection scope of the present disclosure.

The materials involved in the following examples are all commercially available.

The ternary cathode material as the precursor used in the following examples is commercially available, or provided by Zoomwe Group in Guizhou, China.

Example 1

(1) Ni-rich cathode material $Ni_{0.8}Co_{0.1}Mn_{0.1}(OH)_2$ as the precursor, $LiOH \cdot H_2O$ and $ZrB_2$ were subjected to a mechanical ball milling in the molar ratio of 1:1.05:0.001, 1:1.05:0.002 and 1:1.05:0.003, respectively, and at the rotation speed of 300 rpm for 4 h, obtaining mixtures. The mixtures were placed in an atmosphere furnace, and in an oxygen atmosphere, the mixtures were heated to 650° C. at the heating rate of 1.5° C./min and sintered for 3.5 h, and then heated to 800° C. at the heating rate of 0.75° C./min and sintered for 10 h. The sintered mixtures were cooled to ambient temperature, ground and screened through a 300-mesh sieve, obtaining modified Ni-rich cathode materials, which were labeled as 1ZB-NCM811, 2ZB-NCM811 and 3ZB-NCM811, respectively.

Figure 1:
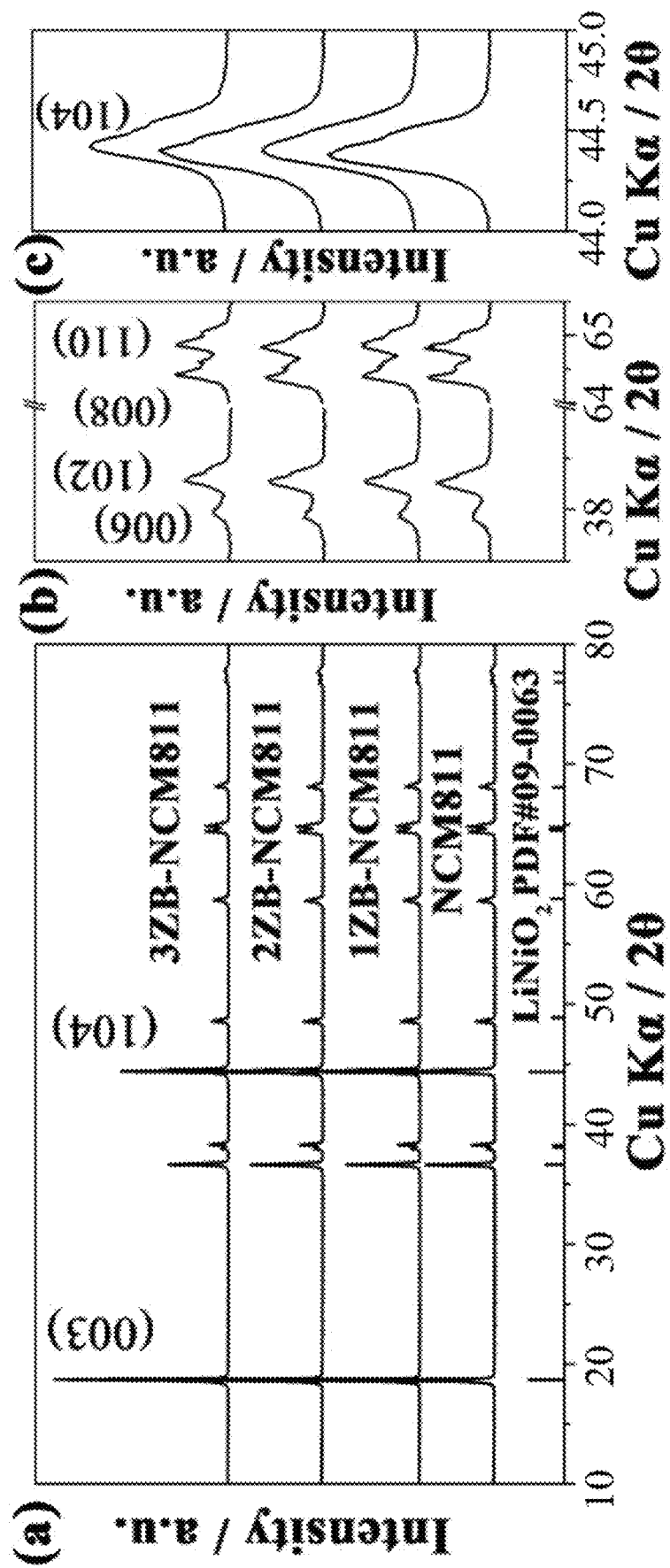
FIG. 1 shows X-ray diffraction (XRD) images of materials as prepared in Example 1 and Comparative Example 1.

(2) The materials 1ZB-NCM811, 2ZB-NCM811 and 3ZB-NCM811 obtained in Example 1 were tested and analyzed by X-ray diffraction (XRD), obtaining their XRD images, which are shown in FIG. 1.

Figure 2:
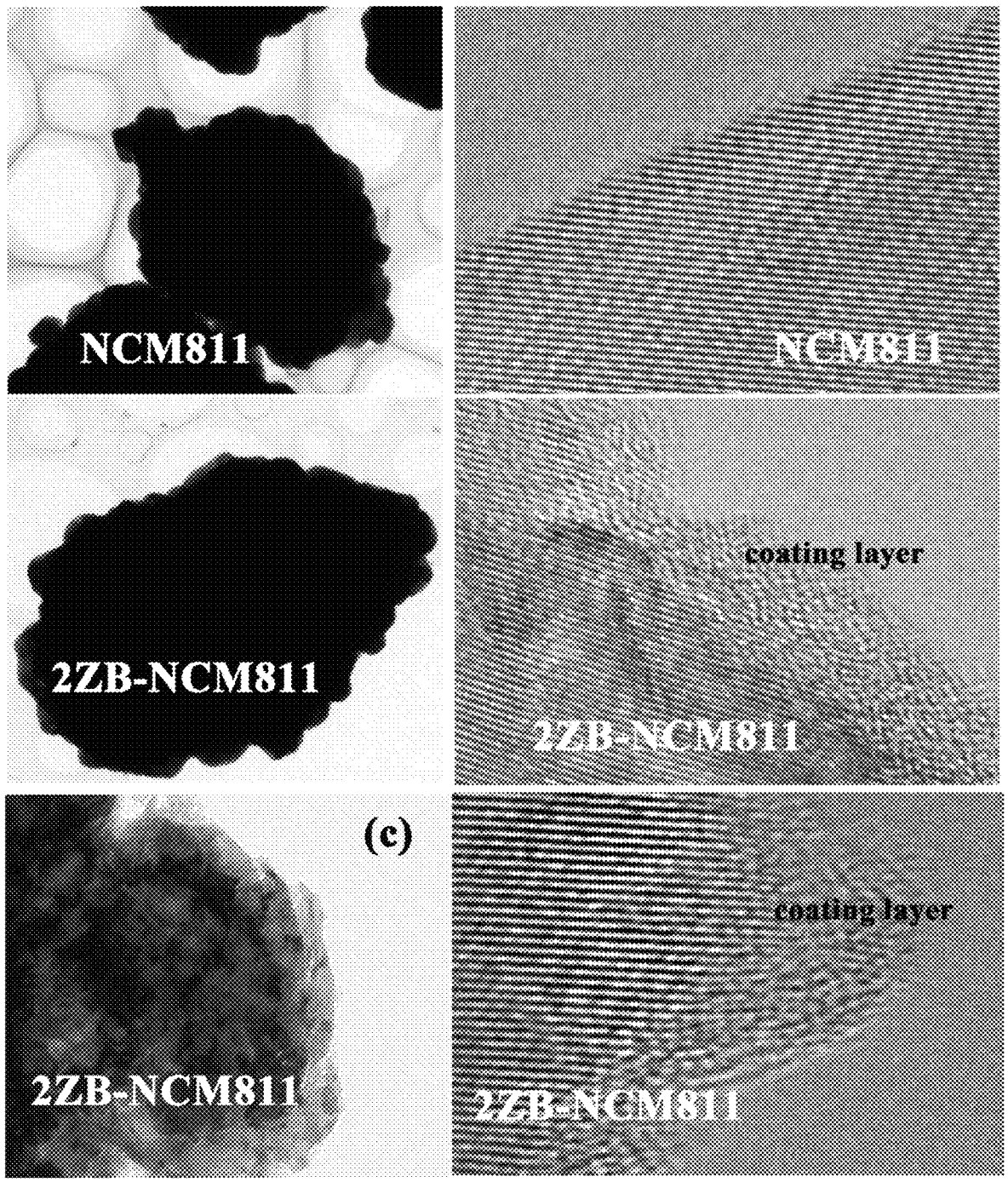
FIG. 2 shows transmission electron microscope (TEM) images of materials as prepared in Example 1 and Comparative Example 1.

(3) The material 2ZB-NCM811 obtained in Example 1 was tested and analyzed by transmission electron microscope (TEM), obtaining a TEM image, which is shown in FIG. 2.

(4) The materials 1ZB-NCM811, 2ZB-NCM811 and 3ZB-NCM811 obtained in Example 1 were assembled into 2016-type button batteries to conduct charge-discharge tests in the voltage range of 3.0-4.3 V.

Figure 3:
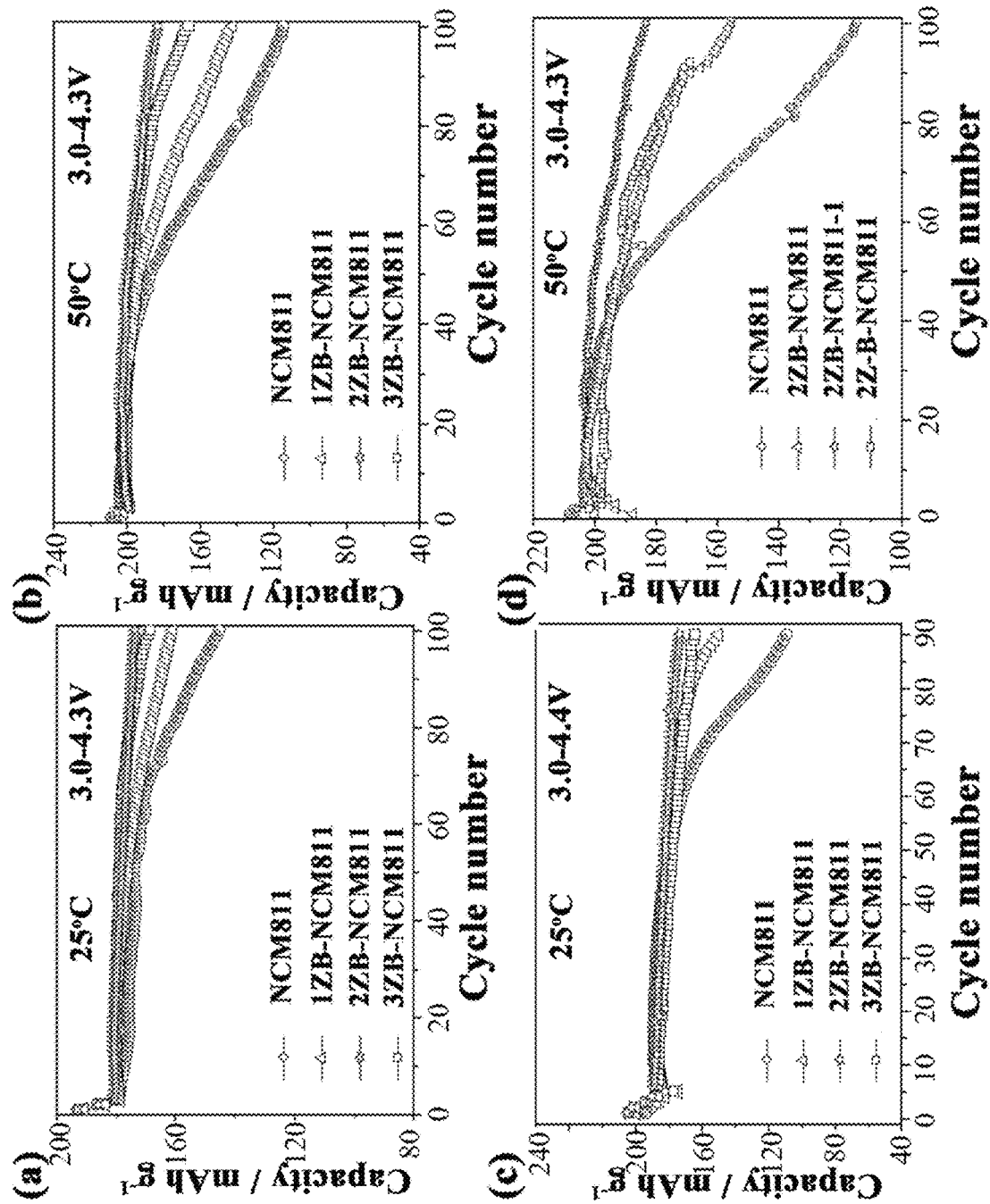
FIG. 3 shows electrochemical cycle diagrams of materials as prepared in Example 1 and Comparative Example 1, 2, and 3.

(5) The tests were carried out at 25° C. and 50° C., respectively. The materials are firstly activated for one cycle at the rates of 0.2 C and 0.5 C, and then for 100 cycles at the rate of 1.0 C. The results are shown in panels (a) and (b) of FIG. 3, Tables 1 and 2.

(6) The materials 1ZB-NCM811, 2ZB-NCM811 and 3ZB-NCM811 obtained in Example 1 were assembled into 2016-type button batteries to conduct high-voltage electrochemical tests at 25° C. in the voltage range of 3.0-4.4 V. The results are shown in panel (c) of FIG. 3.

Figure 4:
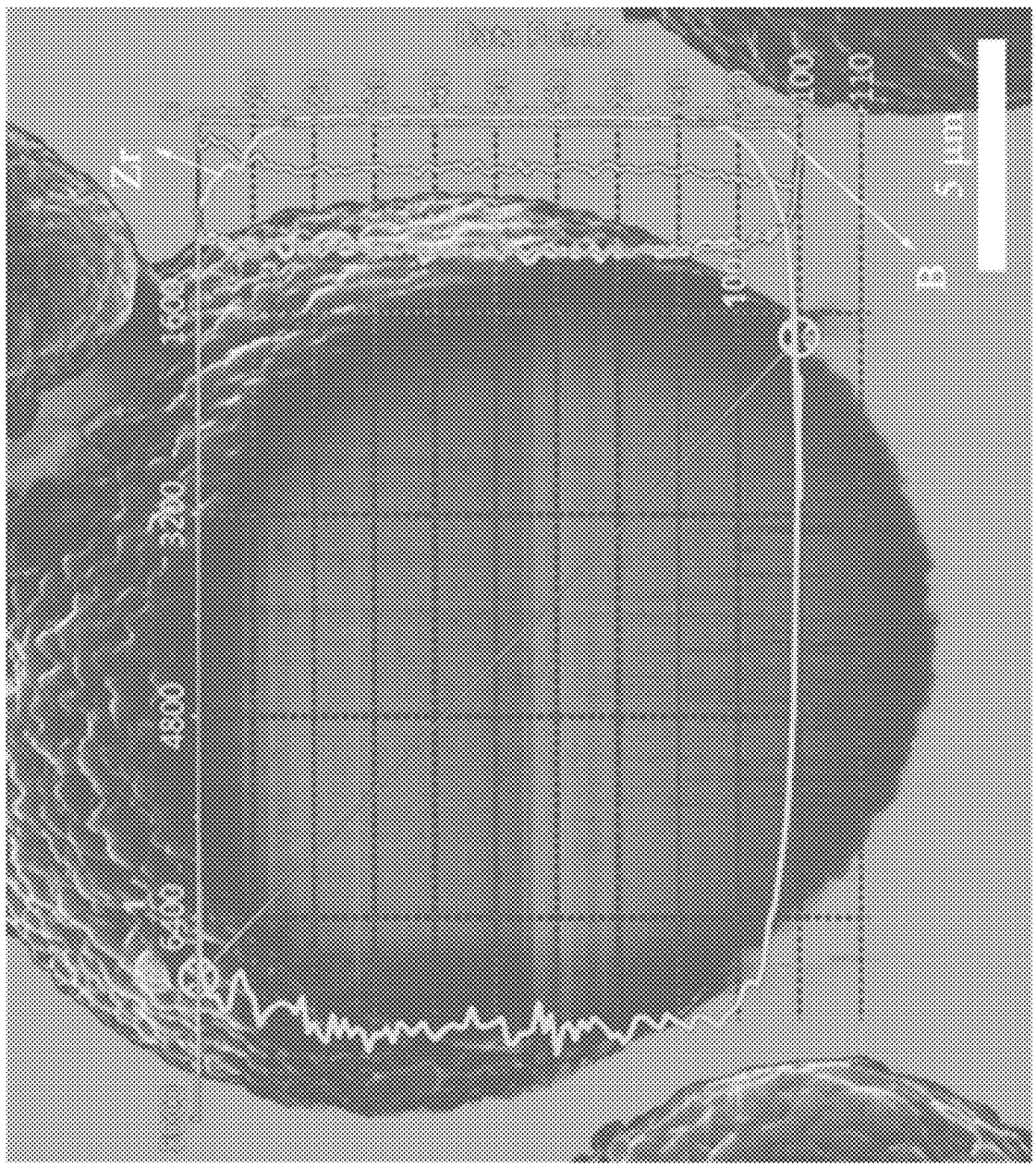
FIG. 4 is a cross-sectional view of 2ZB-NCM811 in Example 1.

(7) The material 2ZB-NCM811 obtained in Example 1 was cross-sectioned by focused ion beam (FIB), and the element content thereof was analyzed, obtaining a cross-section view, which is shown in FIG. 4.

(8) The morphology and element distribution of the material 2ZB-NCM811 obtained in Example 1 were analyzed by scanning electron microscope (SEM), FIB-SEM and an element mapping, obtaining SEM images, which are shown in FIGS. 5C to 5I.

Example 2

(1) Ni-rich cathode material $Ni_{0.8}Co_{0.1}Mn_{0.1}(OH)_2$ as the precursor, $LiOH \cdot H_2O$ and $TiB_2$ were subjected to a mechanical ball milling in the molar ratio of 1:1.05:0.002 at the rotation speed of 300 rpm for 4 h, obtaining a mixture. The mixture was placed in an atmosphere furnace, and in an oxygen atmosphere, the mixture was heated to 650° C. at the heating rate of 1.5° C./min and sintered for 3.5 h, and then heated to 800° C. at the heating rate of 0.75° C./min and sintered for 10 h. The sintered mixture was cooled to ambient temperature, ground and screened through a 300-mesh sieve, obtaining a modified Ni-rich cathode material, which is labeled as 2 TB-NCM811.

Figure 6:
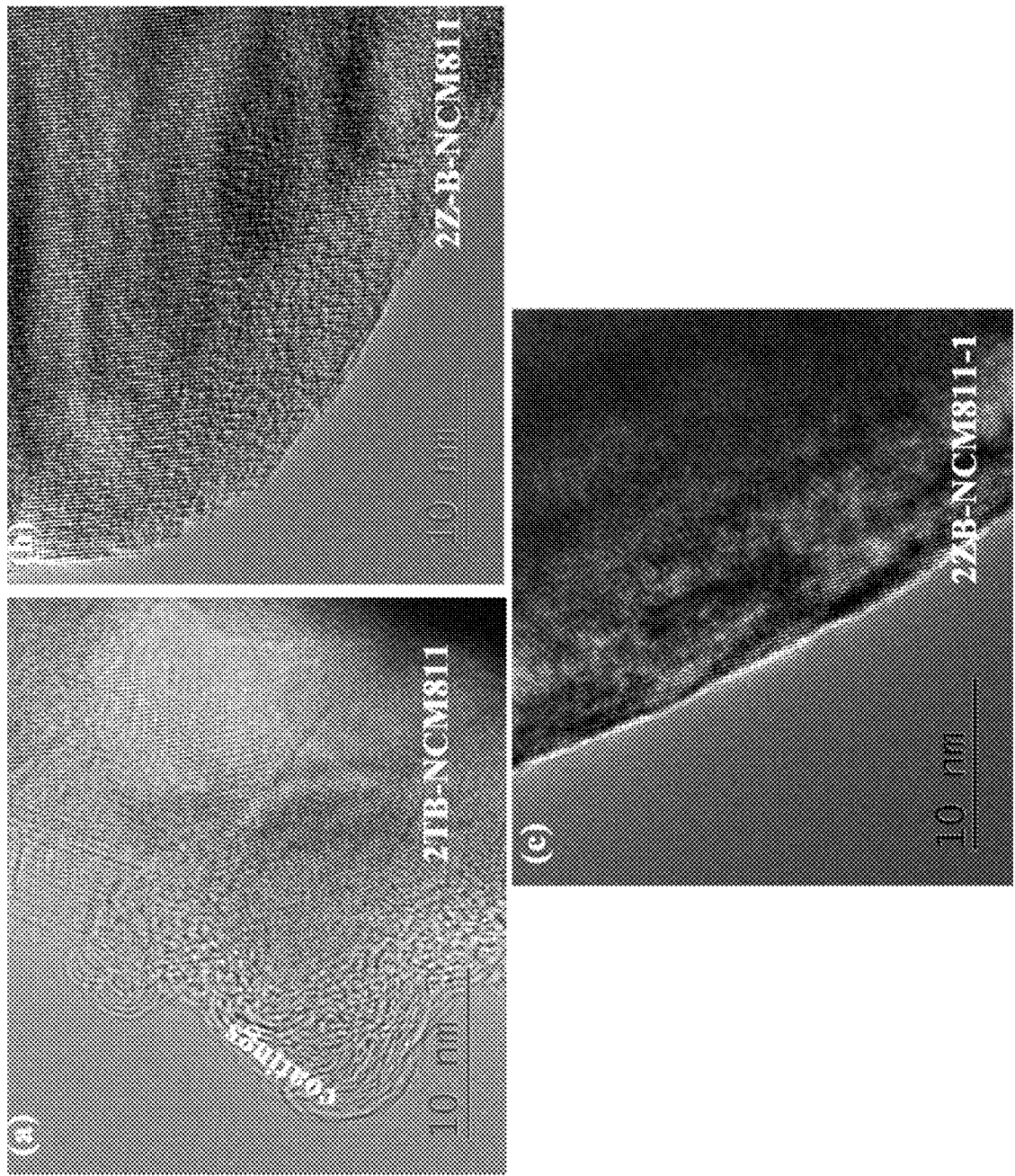
FIG. 6 shows TEM images of materials as prepared in Example 2 and Comparative Examples 2 and 3.

(2) The material 2 TB-NCM811 obtained in Example 2 was tested and analyzed by TEM, obtaining a TEM image, which is shown in panel (a) of FIG. 6.

(3) The material 2 TB-NCM811 obtained in Example 2 was assembled into a 2016-type button battery to conduct a charge-discharge test in the voltage range of 3.0-4.3 V.

(4) The test was conducted at 25° C. The material was firstly activated for one cycle at the rates of 0.2 C and 0.5 C, and then for 100 cycles at the rate of 1.0 C. The results are shown in Table 1.

(5) The test was conducted at 50° C. The material was firstly activated for one cycle at the rates of 0.2 C and 0.5 C, and then for 100 cycles at the rate of 1.0 C. The electrochemical performance is shown in Table 2.

Comparative Example 1

(1) Ni-rich cathode material $Ni_{0.8}Co_{0.1}Mn_{0.1}(OH)_2$ as the precursor, and $LiOH \cdot H_2O$ were subjected to a mechanical ball milling in the molar ratio of 1:1.05 at the rotation speed of 300 rpm for 4 h, obtaining a mixture. The mixture was placed in an atmosphere furnace, and in an oxygen atmosphere, the mixture was heated to 650° C. at the heating rate of 1.5° C./min and sintered for 3.5 h, and then heated to 800° C. at the heating rate of 0.75° C./min and sintered 10 h. The sintered mixture was cooled to ambient temperature, ground and screened through a 300-mesh sieve, obtaining an unmodified Ni-rich cathode material, which was labeled as NCM811.

(2) The material NCM811 obtained in Comparative Example 1 was tested and analyzed by XRD, obtaining an XRD image, which is shown in FIG. 1.

(3) The material NCM811 obtained in Comparative Example 1 was tested and analyzed by TEM, obtaining a TEM image, which is shown in FIG. 2.

(4) The material NCM811 obtained in Comparative Example 1 was assembled into a 2016-type button battery to conduct charge-discharge tests in the voltage range of 3.0-4.3 V.

(5) The tests were carried out at 25° C. and 50° C. respectively. The material was firstly activated for one cycle at the rates of 0.2 C and 0.5 C, and then for 100 cycles at the rate of 1.0 C. The results are shown in panels (a) and (b) of FIG. 3, and Tables 1 and 2.

(6) The material NCM811 obtained in Comparative Example 1 was assembled into a 2016-type button battery to conduct a high-voltage electrochemical test at 25° C. in the voltage range of 3.0-4.4 V. The results are shown in panel (c) of FIG. 3.

Figure 5A:
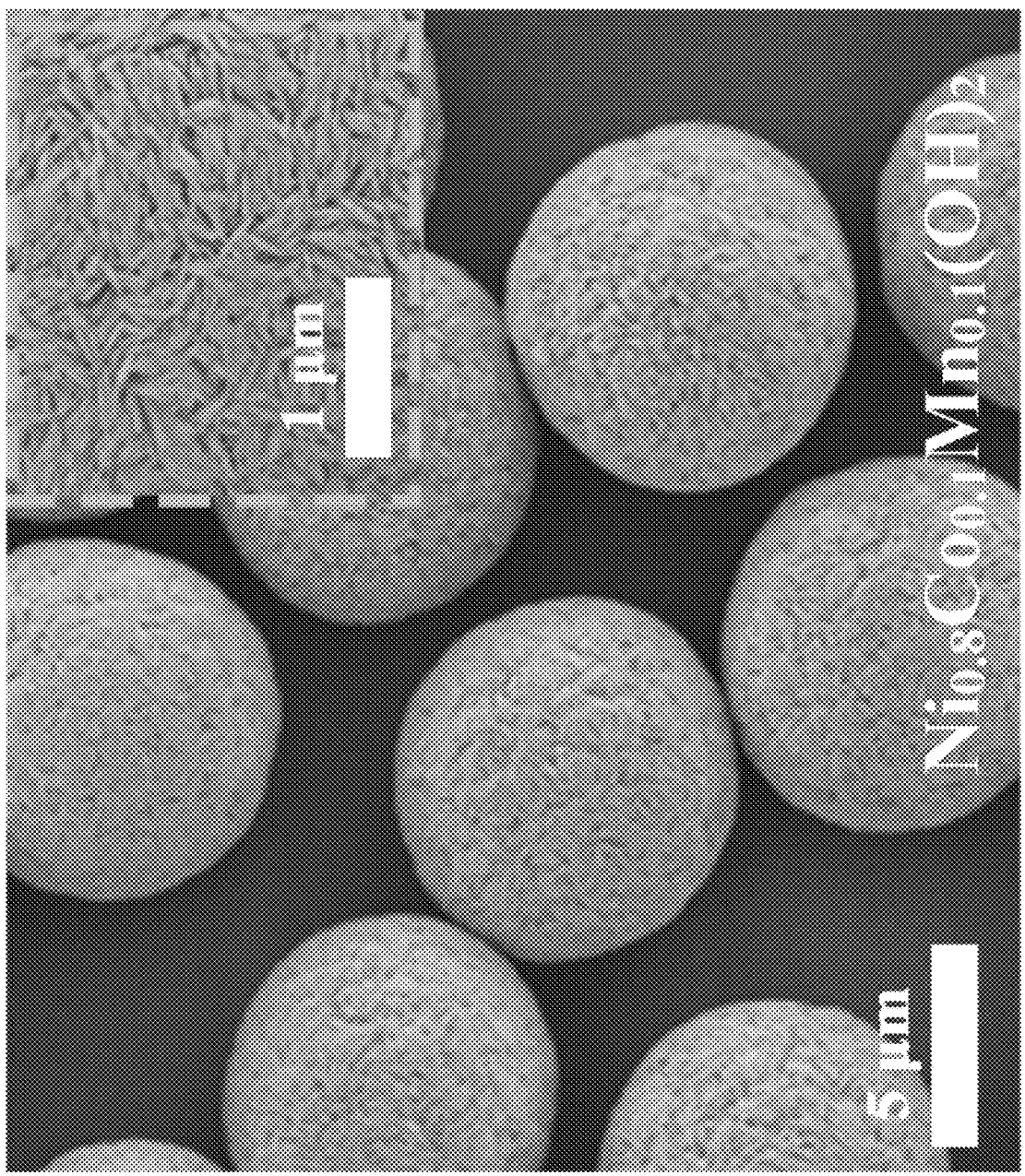
FIGS. 5A to 5C show scanning electron microscope (SEM) images of $Ni_{0.8}Co_{0.1}Mn_{0.1}(OH)_2$, NCM811 in Comparative Example 1 and 2ZB-NCM811 in Example 1, respectively.
Figure 5B:
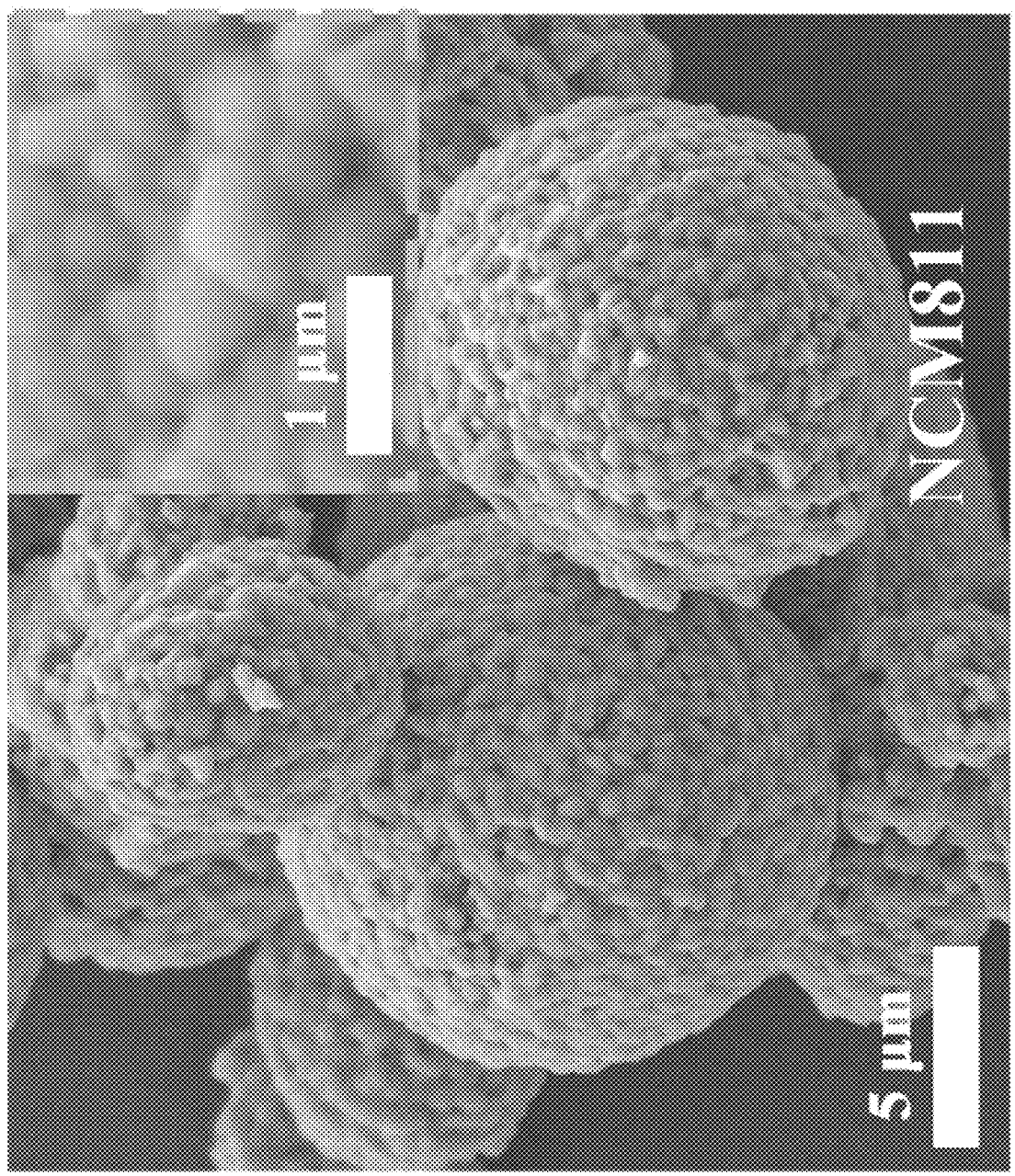
Figure 5C:
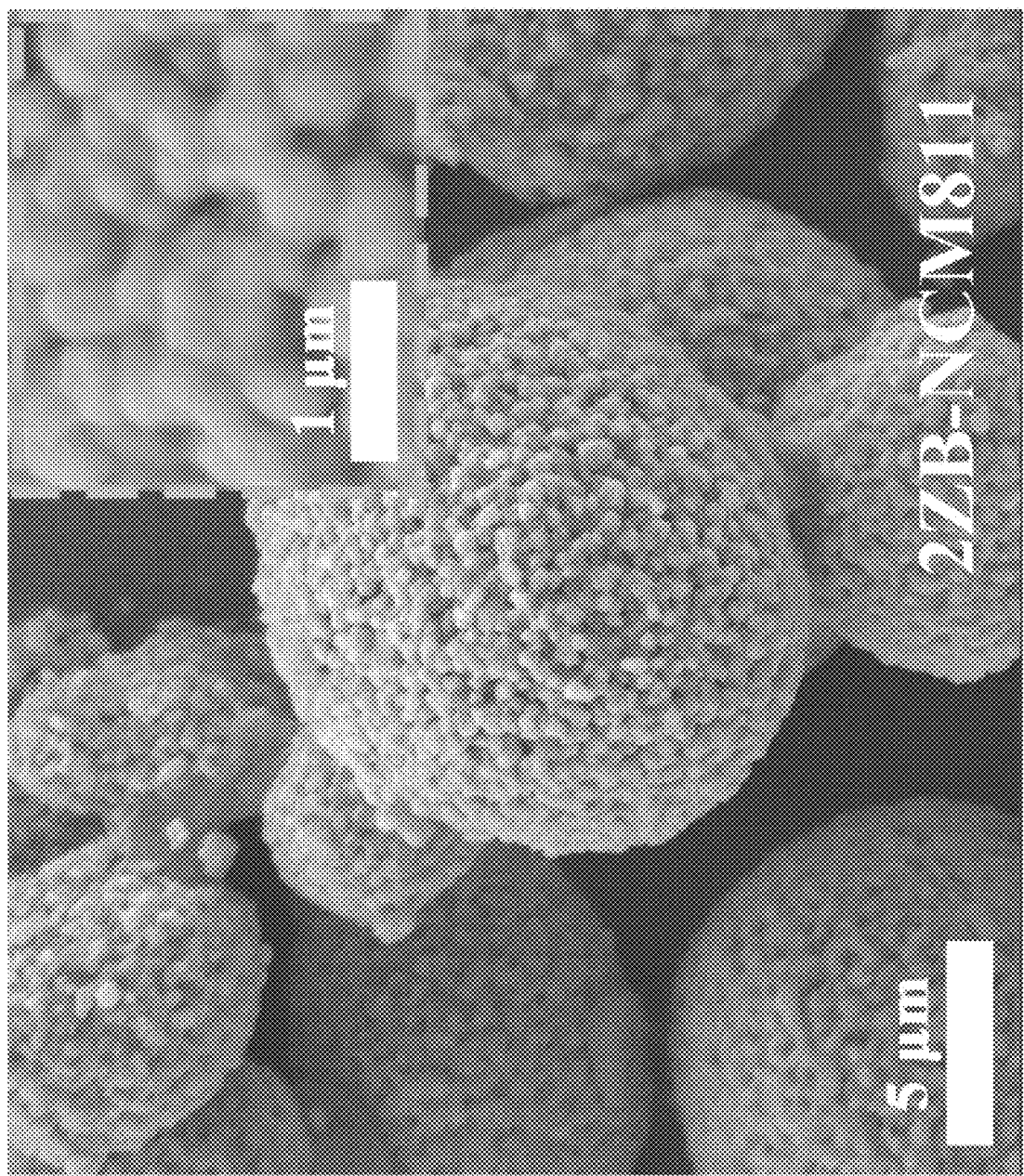
Figure 5D:
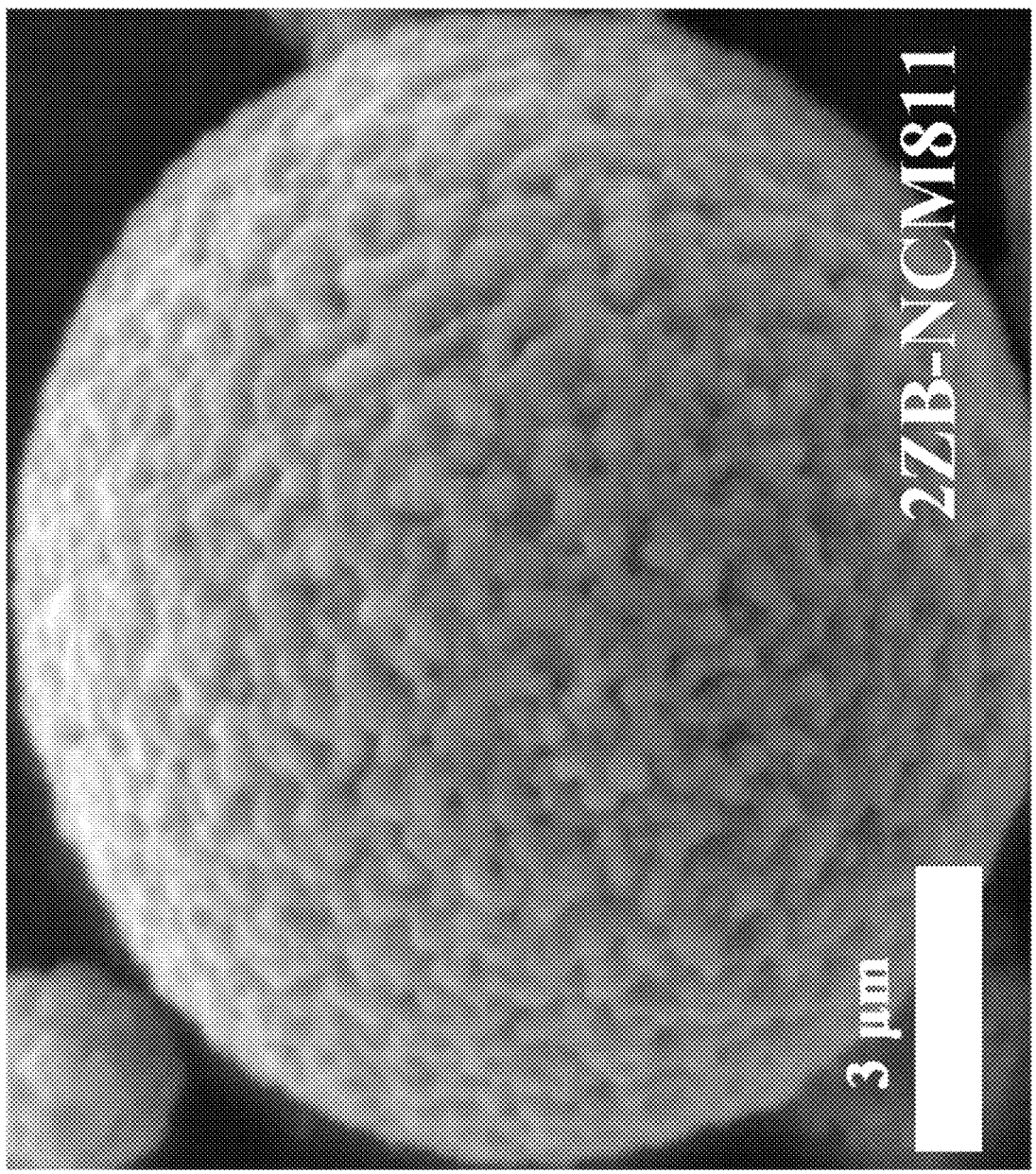
FIG. 5D is an enlarged SEM image of 2ZB-NCM811 in Example 1.
Figure 5E:
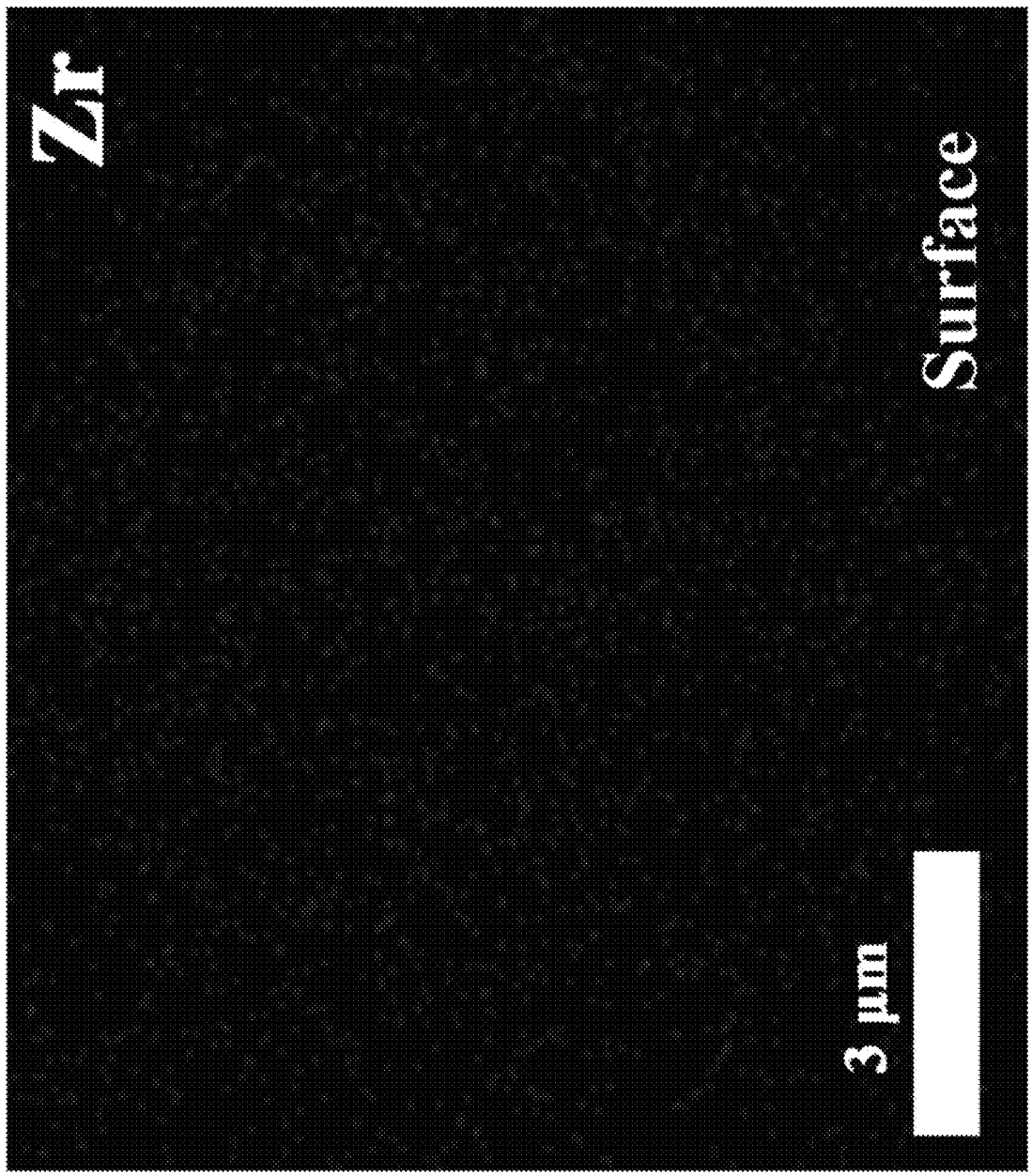
FIGS. 5E to 5F show Zr and B mappings on the surface of 2ZB-NCM811 in Example 1, respectively.
Figure 5F:
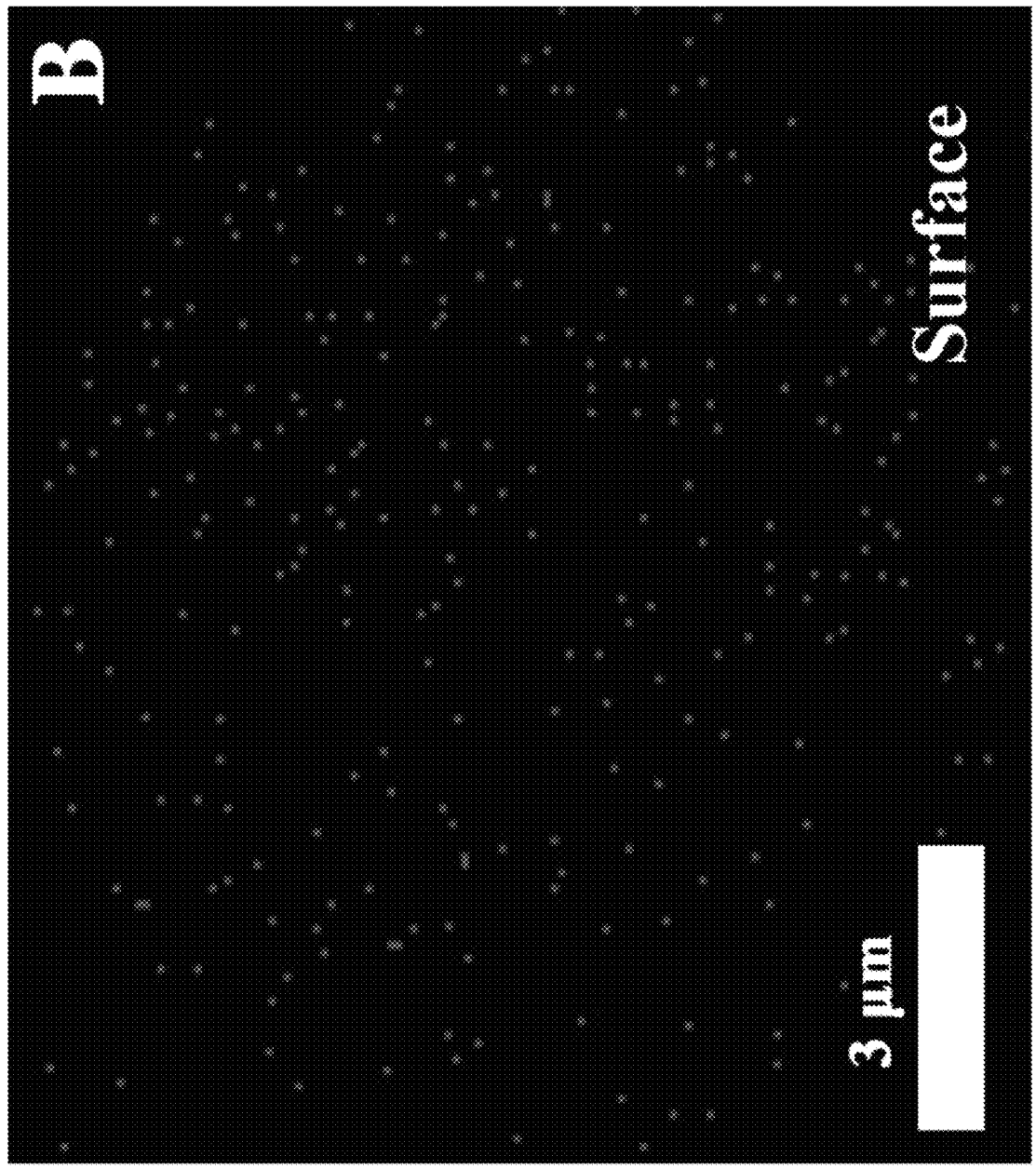
Figure 5G:
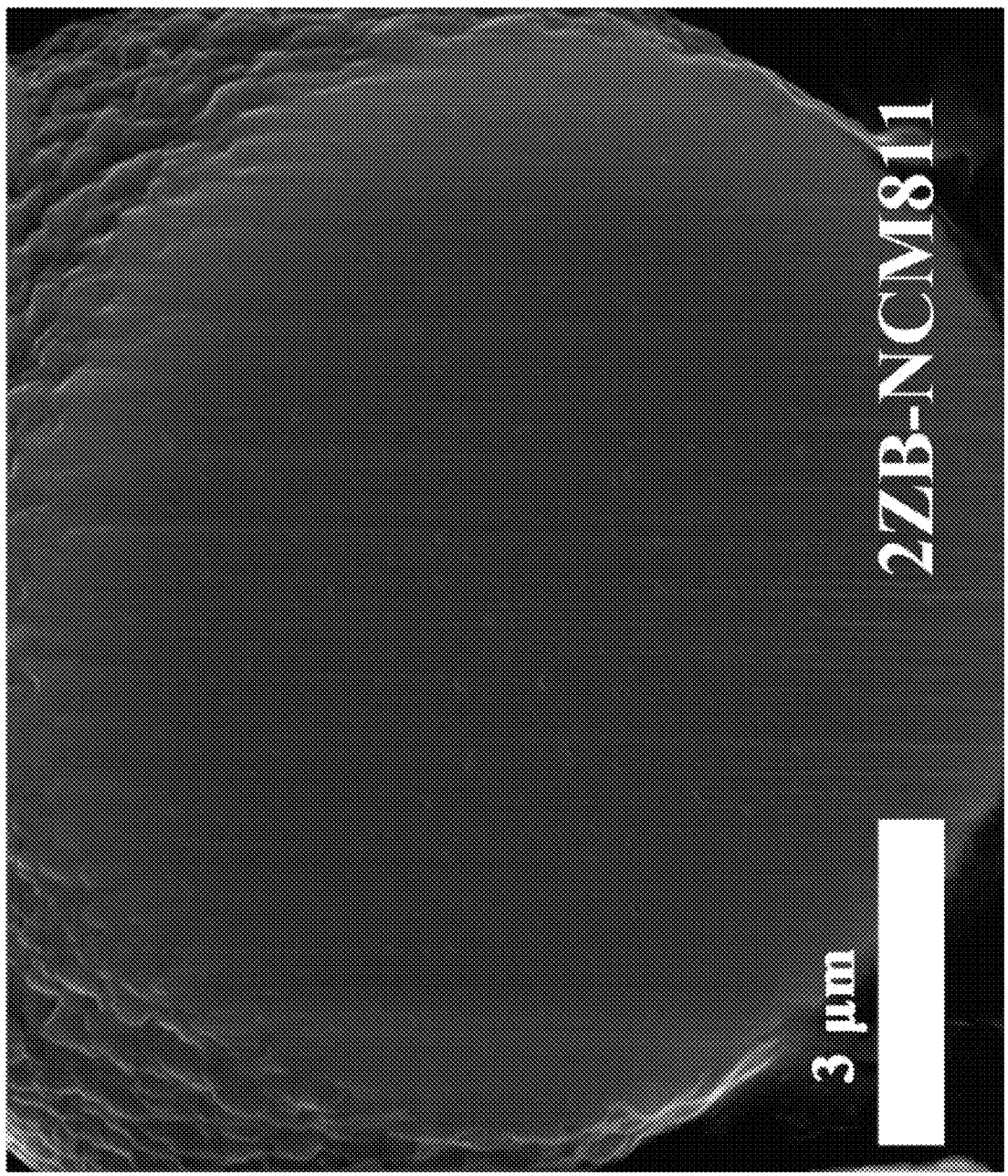
FIG. 5G is a focused ion beam-scanning electron microscope (FIB-SEM) image of 2ZB-NCM811 in Example 1.
Figure 5H:
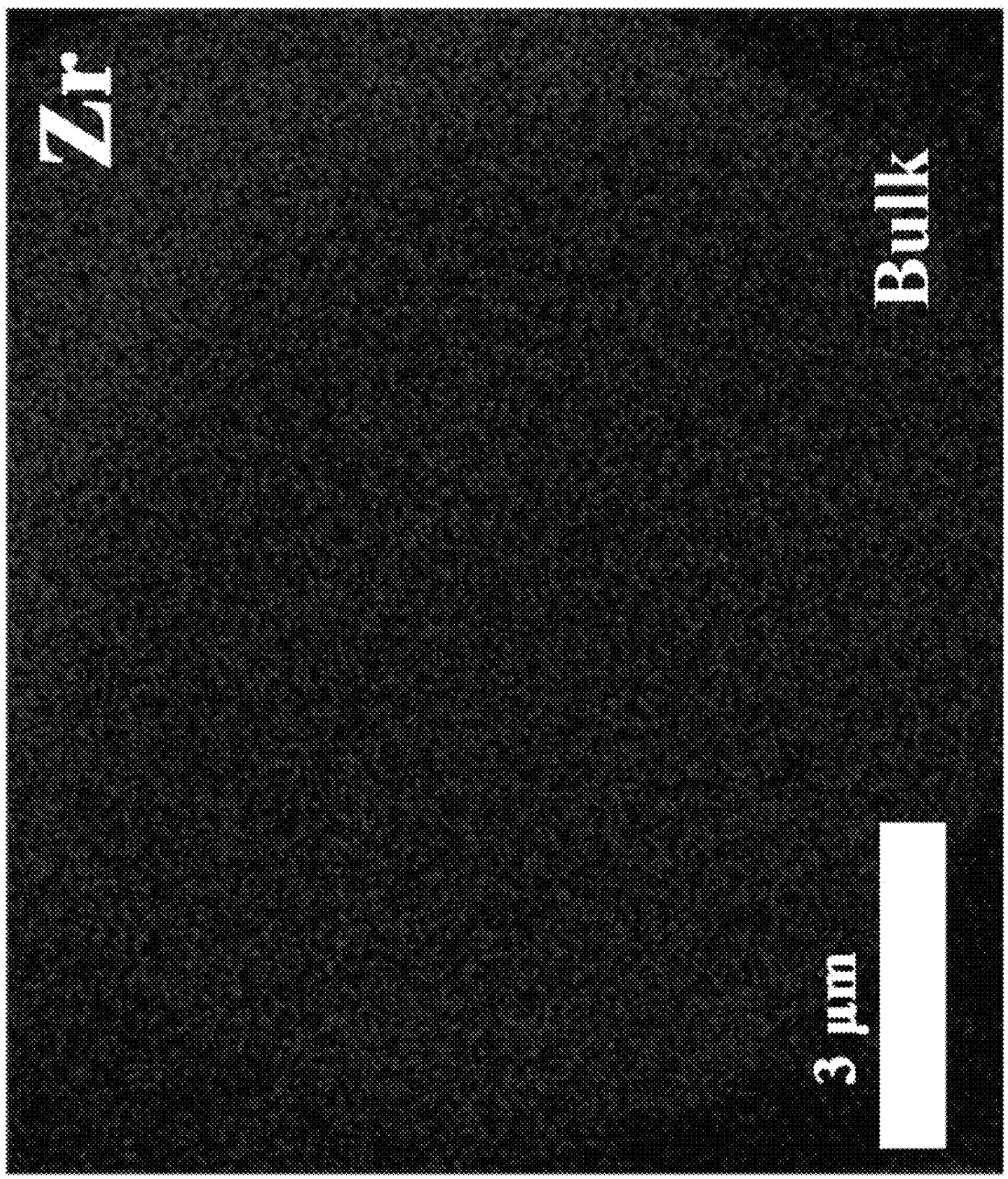
FIGS. 5H to 5I show Zr and B mappings in the bulk of 2ZB-NCM811 in Example 1, respectively.
Figure 5I:
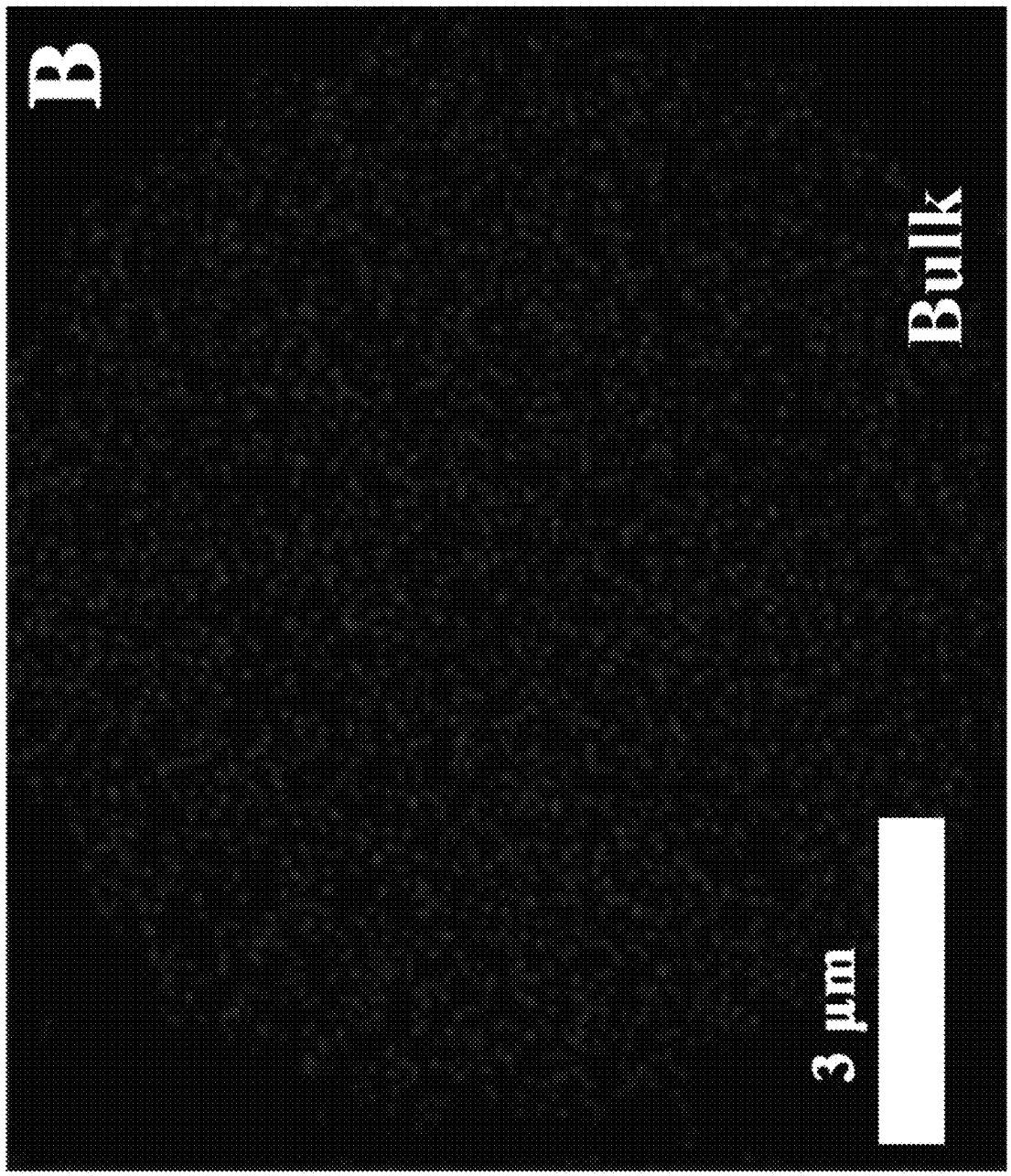

(7) The morphology of the material NCM811 obtained in Comparative Example 1 was analyzed by a SEM, obtaining an SEM image, which is shown in FIG. 5B.

Comparative Example 2

(1) Ni-rich cathode material $Ni_{0.8}Co_{0.1}Mn_{0.1}(OH)_2$ as the precursor, $LiOH \cdot H_2O$, $ZrO_2$, and $B_2O_3$ were subjected to a mechanical ball milling in the molar ratio of 1:1.05:0.002:0.002 at the rotation speed of 300 rpm for 4 h, obtaining a mixture. The mixture was placed in an atmosphere furnace and in an oxygen atmosphere, the mixture was heated to 650° C. at the heating rate of 1.5° C./min and sintered for 3.5 h, and then heated to 800° C. at the heating rate of 0.75° C./min and sintered for 10 h. The sintered mixture was cooled to ambient temperature, ground and screened through a 300-mesh sieve, obtaining a modified Ni-rich cathode material, which was labeled 2Z-B-NCM811.

(2) The material 2Z-B-NCM811 obtained in Comparative Example 2 was tested and analyzed by TEM, obtaining a TEM image, which is shown in panel (b) of FIG. 6.

(3) The material 2Z-B-NCM811 obtained in Comparative Example 2 was assembled into a 2016-type button battery to conduct a charge-discharge test in the voltage range of 3.0-4.3 V at 25° C. The material was firstly activated for one cycle at the rates of 0.2 C and 0.5 C, and then for 100 cycles at the rate of 1.0 C. The initial charge and discharge capacity and efficiency are shown in Table 1. An electrochemical cycle was conducted at the rate of 1.0 C, and the discharge specific capacity at the $100^{th}$ cycle is shown in Table 1.

(4) The material 2Z-B-NCM811 obtained in Comparative Example 2 was assembled into a 2016-type button battery to conduct a charge-discharge test in the voltage range of 3.0-4.3 V at 50° C. The results are shown in panel (d) of FIG. 3 and Table 2.

Comparative Example 3

(1) Ni-rich cathode material $Ni_{0.8}Co_{0.1}Mn_{0.1}(OH)_2$ as the precursor, $LiOH \cdot H_2O$, and $ZrB_2$ were subjected to a mechanical ball milling in the molar ratio of 1:1.05:0.002 at the rotation speed of 300 rpm for 4 h, obtaining a mixture. The mixture was placed in an atmosphere furnace, and in an oxygen atmosphere, the mixture was heated to 650° C. at the heating rate of 1.5° C./min and sintered for 3.5 h, and then heated to 800° C. at the heating rate of 0.75° C./min and sintered for 10 h. The obtained material was cooled to ambient temperature, ground and screened through a 300-mesh sieve, obtaining a modified Ni-rich cathode material, which was labeled as 2ZB-NCM811-1.

(2) The material 2ZB-NCM811-1 obtained in Comparative Example 3 was tested and analyzed by TEM, obtaining a TEM image, which is shown in panel (c) of FIG. 6.

(3) The material 2ZB-NCM811-1 obtained in Comparative Example 3 was assembled into a 2016-type button battery to conduct a charge-discharge test in the voltage range of 3.0-4.3 V at 25° C. The material was firstly activated for one cycle at the rates of 0.2 C and 0.5 C, and then for 100 cycles at the rate of 1.0 C. The initial charge and discharge capacity and efficiency are shown in Table 1. An electrochemical cycle is conducted at the rate of 1.0 C, and the discharge specific capacity at the $100^{th}$ cycle is shown in Table 1.

(4) The material 2ZB-NCM811-1 obtained in Comparative Example 3 was assembled into a 2016-type button battery to conduct a charge-discharge test in the voltage range of 3.0-4.3 V at 50° C. The results are shown in panel (d) of FIG. 3 and Table 2.

TABLE 1

Comparison of the electrical performance of materials obtained in Examples and Comparative Examples (tested at 25° C.).

| Name | Material No. | Initial discharge capacity (mAh/g) | Initial charge capacity (mAh/g) | Initial coulombic efficiency (%) | Discharge specific capacity after 100 cycles (mAh/g) |
|---|---|---|---|---|---|
| Example 1 | 1ZB-NCM811 | 190.9 | 224.3 | 85.1 | 161 |
|  | 2ZB-NCM811 | 193.3 | 222.7 | 86.8 | 173.9 |
|  | 3ZB-NCM811 | 193 | 223.6 | 86.3 | 168.9 |
| Example 2 | 2TB-NCM811 | 192.1 | 220.1 | 87.2 | 170.4 |
| Comparative Example 1 | NCM811 | 191.1 | 222.7 | 85.8 | 145.3 |
| Comparative Example 2 | 2Z-B-NCM811 | 190.8 | 221.6 | 86.1 | 160.2 |
| Comparative Example 3 | 2ZB-NCM811-1 | 191.7 | 222.4 | 86.2 | 164.2 |

TABLE 2

Comparison of the electrical performance of materials obtained in Examples and Comparative Examples (tested at 50° C.).

| Name | Material No. | Initial discharge capacity (mAh/g) | Initial charge capacity (mAh/g) | Initial coulombic efficiency (%) | Discharge specific capacity after 90 cycles (mAh/g) | Discharge specific capacity after 100 cycles (mAh/g) |
|---|---|---|---|---|---|---|
| Example 1 | 1ZB-NCM811 | 206.3 | 222.9 | 92.5 | 177.1 | 166.8 |
|  | 2ZB-NCM811 | 206.3 | 222.5 | 92.7 | 188.6 | 183.5 |
|  | 3ZB-NCM811 | 207.1 | 223.6 | 92.6 | 153.7 | 142.5 |
| Example 2 | 2TB-NCM811 | 205.8 | 222.5 | 92.5 | 178.7 | 162.1 |
| Comparative Example 1 | NCM811 | 208.7 | 226.6 | 92.1 | 126.1 | 115 |
| Comparative Example 2 | 2Z-B-NCM811 | 190.9 | 214.7 | 88.9 | 169 | — |
| Comparative Example 3 | 2ZB-NCM811-1 | 200.6 | 218.5 | 91.8 | 171 | — |

It can be seen from the cross-sectional view shown in FIG. 4 of the modified material 2ZB-NCM811 obtained in Example 1 of the present disclosure that Zr and B in the material are uniformly doped into the material lattice. Moreover, combined with the TEM image in FIG. 2, it can be seen that a part of Zr remaining on the surface of the material reacts with the residual lithium to form a surface coating layer of lithium zirconium oxide. The modified materials obtained by other methods or modifiers (as shown in panels (b) and (c) of FIG. 6) have complete lattice on the surface without coating layers, indicating that the modifiers are uniformly doped into the material lattice without forming coating layers.

From Tables 1-2 and FIGS. 1-6, it can be seen that the modified Ni-rich ternary cathode material obtained by the method of the present disclosure has diatomic lattice doping and surface coating by using $ZrB_2$ and $TiB_2$ as the modifiers with a specific heating process. The structure stability of the modified Ni-rich ternary cathode material is greatly improved due to the diatomic lattice doping. Moreover, the formed surface coating layer is beneficial to protect the interface of the material, inhibit the dissolution of the transition metal on the surface of the material, and reduce the catalytic decomposition of the electrolyte. Therefore, the modified Ni-rich ternary cathode material obtained by the method has improved structure and interface stability. And the best modified material has a capacity retention rate of 89.9% after undergoing 100 cycles at the rate of 1.0 C under ambient temperature, while the unmodified material only has a capacity retention rate of 76.1%. In addition, after undergoing 100 cycles at the rate of 1.0 C under high temperature, the modified material has a specific capacity as high as 183.1 mAh/g, and a capacity retention rate of 88.1%, which is much higher than that (55.1%) of the unmodified material. Moreover, the modified material also exhibits excellent high voltage performance. After undergoing 90 cycles at 4.4 V under ambient temperature, the modified material still has a capacity retention rate as high as 84.7%, which is higher than that (56.4%) of the unmodified material.

The above examples are preferred embodiments of the present disclosure, not limiting the implementation of the present disclosure. Any other changes, modifications, substitutions, combinations, and simplifications made without deviating from the spirit and principle of the present disclosure shall be considered as equivalent replacements, which shall fall within the protection scope of the present disclosure.

What is claimed is:

1. A method for preparing a Ni-rich ternary cathode material, comprising:
   mixing a Ni—Co—Mn ternary cathode material precursor, a metal boride as a modifier, and a lithium-derived material to obtain a mixed material, and sintering the mixed material, to obtain the Ni-rich ternary cathode material,
   wherein the Ni—Co—Mn ternary cathode material precursor is $Ni_xCo_yMn1_{-x-y}(OH)_2$, where $0.8 \leq x < 1$, $0 < y < 0.2$, and $x+y<1$, and
   the sintering comprises a first sintering and a second sintering sequentially carried out in oxygen, wherein the first sintering is conducted at a first temperature of 550-700° C. for 1-5 h, and the second sintering is conducted at a second temperature of 750-850° C. for 5-15 h, a first heating rate for heating to the first temperature is not more than 2° C./min, and a second heating rate for heating to the second temperature is not more than 0.75° C./min.

2. The method of claim 1, wherein the metal boride comprises a transition metal boride.

3. The method of claim 1, wherein
the lithium-derived material comprises one of $LiOH \cdot H_2O$ and $Li_2CO_3$.

4. The method of claim 1, wherein the mixing comprises subjecting the Ni—Co—Mn ternary cathode material precursor, the lithium-derived material and the metal boride to a mechanical ball milling to obtain the mixed material.

5. The method of claim 4, wherein a molar ratio of the Ni—Co—Mn ternary cathode material precursor to the lithium-derived material to the metal boride is ranging from 1:1.05:0.001 to 1:1.05:0.01.

6. A Ni-rich ternary cathode material, which is prepared by the method of claim 1.

7. A method for preparing a lithium-ion battery cathode material, comprising using a Ni-rich ternary cathode material prepared by the method of claim 1 to prepare the lithium-ion battery cathode material.

8. The method of claim 2, wherein the metal boride is one or two selected from the group consisting of $ZrB_2$, and $TiB_2$.

9. The method of claim 1, wherein the first heating rate is in the range of 1.5-1.8° C./min.

10. The method of claim 1, wherein the second heating rate is in the range of 0.5-0.75° C./min.

11. The method of claim 1, wherein the first sintering is conducted for 3-4 h.

12. The method of claim 1, wherein the second sintering is conducted for 8-12 h.

13. The method of claim 5, wherein the molar ratio of the Ni—Co—Mn ternary cathode material precursor to the lithium-derived material to the metal boride is ranging from 1:1.05:0.001 to 1:1.05:0.005.

* * * * *